Dec. 8, 1936.  J. N. ALEXANDER  2,063,139
SAW ATTACHMENT
Original Filed Nov. 27, 1933
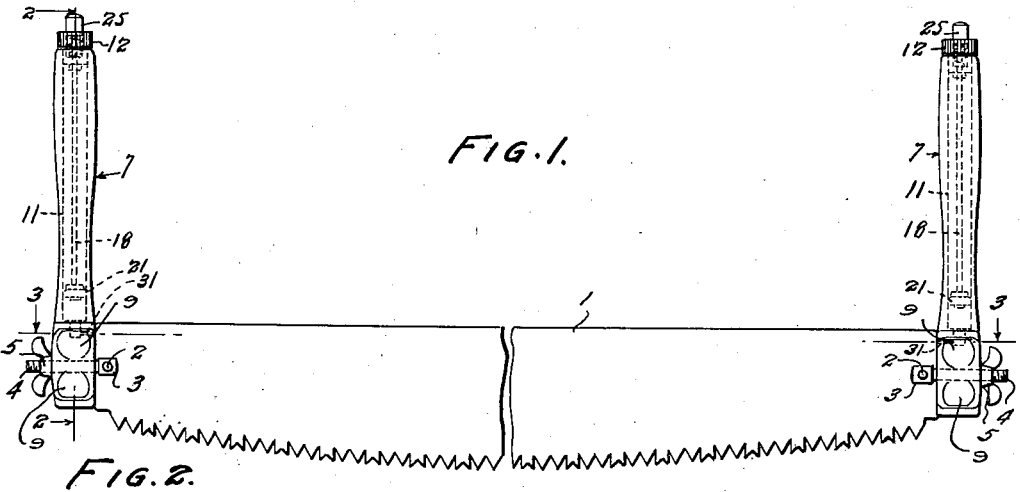
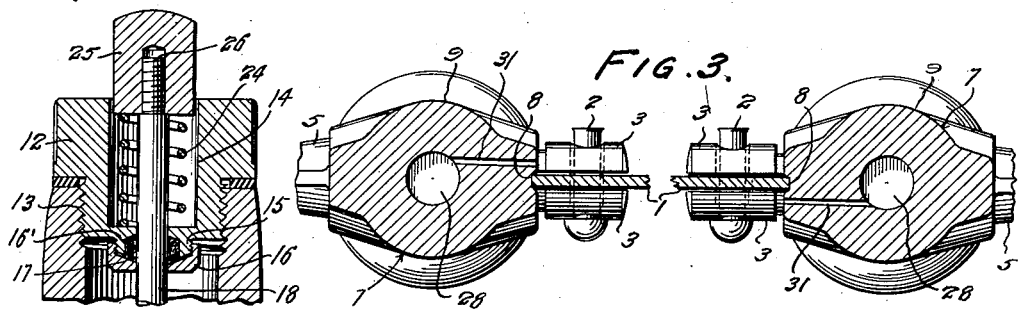
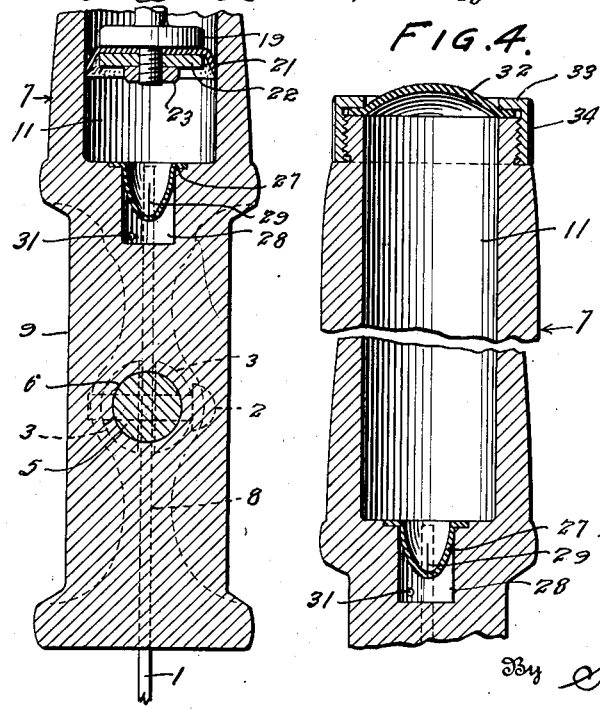
Inventor
JAMES N. ALEXANDER
By Semmes & Semmes
Attorneys Patented Dec. 8, 1936

2,063,139

UNITED STATES PATENT OFFICE 2,063,139

SAW ATTACHMENT

James N. Alexander, Birmingham, Ala.

Application November 27, 1933, Serial No. 699,969
Renewed May 8, 1935

5 Claims. (Cl. 145—35)

My invention relates to a saw mechanism, and more particularly to mechanism for cross-cut saws.

It is an object of my invention to provide a cross-cut saw mechanism which is strong and sturdy, and light in weight, with few operating parts and easy to repair and replace.

Another object of my invention is to provide a cross-cut saw which can be easily and quickly oiled by the operators without wasting oil.

A further object of my invention is to provide a cross-cut saw so arranged that relatively high oil pressures can be generated by the operators so that the oil may be distributed in a stream over the whole length of the blade.

A still further object of my invention is to provide an oiling mechanism which will not be injured by rough usage.

It is my desire that I not be limited in the scope of my invention solely by the objects above set forth, but that the only limitations placed upon my claims be those imposed by the terminology of the claims themselves and the prior art.

My invention is an improvement on my application Serial No. 681,634, filed July 21, 1933, for Saws.

In the drawing:

Figure 1 is a view in side elevation of my saw with parts broken away to lessen the length thereof;

Fig. 2 is a view taken along the line 3—3 of Figure 1;

Fig. 3 is a view taken along the line 3—3 of Figure 1;

Fig. 4 is a detail view of another form of pump.

Referring to the drawing, 1 is a cross-cut saw blade having apertures in its ends through which fit holding pins 2, which pass through bifurcated ends 3 of holding bolts 4 provided with wing nuts 5. The mechanism is the same at either end of the blade.

The holding bolt 4 passes through an aperture 6 formed in a saw handle 7. The saw handle 7 may be formed of aluminum or similar metal in one piece, which gives great strength and rigidity to the parts. The saw handle 7 is grooved, as indicated at 8 (see Figure 3) along its front face, and the saw blade 1 fits in this groove 8. By tightening up the wing nut 5, the saw blade may be firmly held in the grooved portion 8 of the handle 7. In case the saw blade works loose, it is merely necessary to tighten up on the wing nut 5.

For purposes of lightness, cut-out portions 9 can be formed on the saw handle. The saw handle is provided with an upper reservoir 11 into which fits a cap piece 12 which is screw-threaded, as indicated at 13, into the reservoir 11. The cap piece 12 has a circular guideway 14 formed therein, and is provided with a downwardly projecting annular portion 15 upon which is adapted to be screwed a nut 16. The downwardly projecting annular portion 15 has an annular center space 16', in which can be placed packing 17. Through the nut 16 and through the material of the cap piece 12, immediately below the guideway 14, is adapted to pass a plunger 18 having a plunger head 19 that carries a leather washer 21 which is held in place against the plunger head 19 by means of a washer 22 and a nut 23, that is screwed on to a screw-threaded extension of the plunger 18.

Within the guideway 14 is a spring 24, the bottom of which rests against the bottom of the guideway and the top of which is adapted to press against an operating head 25 which may be operated by the thumb or hand of the user of the saw. The operating head 25 is screw-threaded, as indicated at 26, to the top of the plunger 18.

At the bottom of the reservoir is a flip valve 27. The flip valve is in effect a pressure valve and is mounted at the top of an annular chamber 28 formed just below the reservoir 11. This flip valve is resilient and ordinarily does not permit egress of lubricant which may be in the reservoir. It is provided, however, with a slot 29 which will open when the lubricant presses strongly against the interior of the valve, permitting escape of lubricant. The valve will shut when pressure is released.

The chamber 28 can be filled by a lubricant which has been expelled through the flip valve 27 into the chamber 28 from the reservoir 11. This occurs when the user presses downwardly on the operating head 25 to compress the spring 24 and move the plunger head 19 downwardly. The spring 24 tends to return the operating head 25 to the up position. Lubricant driven into the chamber 28 escapes through a port 31 onto one side of the saw blade 1.

The other saw handle is provided with mechanism similar to that just described, but the port 31 is adapted to discharge onto the other surface of the blade 1.

It will be noted that the ports 31 are slightly slanted inwardly so that the stream of lubricant will flow against the blade rather than be discharged in a direction away from the blade.

Moreover, it is to be noted that the discharge from a single reservoir is upon one surface of the blade only. This is important because in oiling the saw it is necessary to turn the flat surface of the saw blade substantially parallel with the ground and thus the oil spreads over the saw blade and covers it sufficiently. The process is then reversed, the saw blade being reversed so that its other side points up and the other handle is then operated to discharge a stream over that surface of the blade. If the saw blade is left in a vertical position, the streams from the reservoirs in the handles will not cover the entire surface of the blade.

In Figure 4 I have shown a saw blade handle in which I have dispensed with the plunger mechanism and have shown the upper end of the reservoir 11 provided with a flexible membrane, such as a rubber membrane 32. This membrane is held in the upper end of the handle by means of a flange 33 which is joined to a downwardly projecting annular member 34 that is internally screw-threaded and is adapted to be screwed on to an externally screw-threaded portion formed at the upper end of the handle 7. This flexible membrane 32 is bowed outwardly, as indicated in Figure 4.

By pressing with the thumb or hand on either the operating head 25 or the membrane 32, oil can be discharged, as indicated, on one surface of the saw blade 1.

I claim:

1. A lubricant ejecting mechanism for a crosscut saw comprising two handles, a blade to which each handle is attached, each handle structure comprising a reservoir for lubricant in the handle, a plunger therein, a head fitting the side walls of the reservoir, means to eject lubricant on one face only of the saw blade comprising a pressure valve, the lubricant from each handle being ejected on opposite faces of the saw blade, a guideway, an operating head adapted to reciprocate in the guideway and closely fitting therein, and a spring in the guideway tending to hold the plunger in a position to relieve pressure on the lubricant, said operating head projecting beyond the upper surface of the handle.

2. A cross cut saw comprising two handles, a blade to which each handle is attached, each handle structure comprising a reservoir, a plunger in the reservoir, a plunger head fitting the side walls of the reservoir, means to eject lubricant on one face only of the saw blade comprising a pressure valve, the lubricant from each handle being ejected on opposite faces of the saw blade, a guideway at the top of the handle, an operating head adapted to reciprocate in the guideway and closely fitting therein and a spring in the guideway tending to hold the plunger in a position to relieve pressure on the lubricant, said operating head projecting beyond the upper surface of the handle.

3. A cross cut saw comprising a pair of handles, a reservoir for lubricant in each handle, a blade to which each handle is attached, a plunger in each reservoir, a plunger head fitting the side walls of each reservoir, separate means to eject lubricant on the saw blade on opposite sides comprising pressure valves, each handle having a guideway at the top of the handle, an operating head adapted to reciprocate in the guideway, and a spring in the guideway tending to hold the plunger in a position to relieve pressure on the lubricant.

4. A cross cut saw comprising a blade, a handle at each end of the blade, means within each handle for discharging lubricant on one side of the blade only by forcibly ejecting a stream of lubricant thereon within the working area thereof, said means operating on opposite sides of the blade and comprising a reservoir for lubricant, a plunger therein, a head fitting the side walls of the reservoir, a pressure valve, a guideway, an operating head adapted to reciprocate in the guideway, and a spring in the guideway tending to hold the plunger in a position to relieve pressure on the lubricant.

5. A cross cut saw comprising a blade, a pair of handles therefor, each handle being provided with a reservoir to hold a supply of lubricant, a conduit in communication with each reservoir and adapted to direct a stream of the lubricant upon the working area of the blade, each reservoir discharging on one surface only, valves to normally prevent the passage of lubricant through the conduits, and means for opening the valves and discharging lubricant comprising plungers in the reservoirs, heads fitting the side walls of the reservoirs, operating heads, guideways for the operating heads located at the tops of the handles, and springs in the guideways tending to hold the plungers in such position as to relieve pressure on the lubricant in each reservoir.

JAMES N. ALEXANDER.